United States Patent
Yamamoto (10) Patent No.: US 12,532,025 B2
(45) Date of Patent: Jan. 20, 2026

(54) COMPRESSED SENSING SYSTEM AND METHOD THEREFOR

(71) Applicant: Hitachi, Ltd., Tokyo (JP)

(72) Inventor: Keisuke Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 64 days.

(21) Appl. No.: 18/527,729

(22) Filed: Dec. 4, 2023

(65) Prior Publication Data

US 2024/0205452 A1     Jun. 20, 2024

(30) Foreign Application Priority Data

Dec. 20, 2022 (JP) ................. 2022-202691

(51) Int. Cl.
*H04N 19/63* (2014.01)
*H04N 19/587* (2014.01)
*H04N 19/597* (2014.01)
*H04N 19/625* (2014.01)

(52) U.S. Cl.
CPC ......... *H04N 19/587* (2014.11); *H04N 19/597* (2014.11); *H04N 19/625* (2014.11); *H04N 19/63* (2014.11)

(58) Field of Classification Search
CPC .. H04N 19/587; H04N 19/597; H04N 19/625; H04N 19/63
See application file for complete search history.

(56) References Cited

U.S. PATENT DOCUMENTS

2023/0386088 A1\* 11/2023 Oh .................. G06T 9/005
2024/0202982 A1\* 6/2024 Dai ................ G06T 9/40

OTHER PUBLICATIONS

Euee S. Jang et al., "Video-Based Point-Cloud-Compression Standard in MPEG: From Evidence Collection to Committee Draft", IEEE Signal Processing Magazine, May 2019.
Tim Golla et al., "Real-time Point Cloud Compression," IEEE, 2015.

\* cited by examiner

*Primary Examiner* — Tat C Chio
(74) *Attorney, Agent, or Firm* — Miles & Stockbridge, P.C.

(57) ABSTRACT

Three-dimensional sensing data is transferred efficiently by applying compressed sensing using dictionary learning. Conventional image-based lossy compression improves a feature according to which power is concentrated on low-frequency components and deterioration of three-dimensional information increases. By changing the decimation rates for the depth information and the color information and using a dictionary vector created from the other restoration result for restoration, the original result is reconstructed using a small data volume.

11 Claims, 8 Drawing Sheets

COMPRESSED SENSING SYSTEM AND METHOD THEREFOR

CROSS-REFERENCE TO RELATED APPLICATION

This application claims priority to Japanese Patent Application No. 2022-202691 filed on Dec. 20, 2022, the entire contents of which are incorporated by reference herein.

BACKGROUND OF THE INVENTION

1. Field of the Invention

The present invention relates to a compressed sensing system for transmitting and receiving sensing data used to create data representing three dimensions, and a method therefor.

2. Description of the Related Art

As background art of the present technical field, a compressed encoding system for data representing three dimensions such as a point cloud (point group) has been proposed. For example, a method for compressing a geometric structure of a point group by using a direct tree method has been proposed (Tim Golla and Reinhard Klein, "Real-time Point Cloud Compression," IEEE, 2015). In addition, as a method that employs existing moving image compression technology, a method has been proposed wherein a three-dimensional model is converted into a plurality of pieces of image information, a point group is compressed using an image compression method, and the point group is reconstructed after expansion (Euee S. Jang et al., "Video-Based Point-Cloud-Compression Standard in MPEG: From Evidence Collection to Committee Draft", IEEE Signal Processing Magazine, May 2019).

SUMMARY OF THE INVENTION

In an IoT system in which data acquired by a conventional sensor terminal is collected by an edge node and data processing is performed, there is a problem that, in a case where three-dimensional data is transferred, the data volume increases and the bandwidth is tightened in comparison with a case where two-dimensional data is transmitted. In particular, efficient compression/expansion systems are well known for two-dimensional data, but such systems are normally implemented by concentrating power on low-frequency components and deleting data of radio frequency components, and a deterioration in accuracy with regard to distances and depth maps obtained using three-dimensional data occurs. It is therefore difficult to apply two-dimensional data to three-dimensional data without further processing. Therefore, there is a problem that it is difficult to construct an IoT system that transmits and utilizes three-dimensional data in real time.

In order to solve the above problems, the present invention provides a compressed sensing system, and a method therefor, for transmitting three-dimensional data as at least depth information or parallax information and color information, the system transmitting partially reduced data on a transmission side and restoring the data on a reception side based on a basis matrix and sparsity, wherein, at the time of restoration, the reception side obtains an additional basis vector from restoration information of the depth information or the parallax information and a restoration result of the color information, and uses the basis vector in restoration of at least one of the depth information or the parallax information, and the color information.

A representative example of the invention disclosed in the present application is as follows. That is, in a system for restoring three-dimensional data from a depth map and image data acquired by a sensor terminal, three-dimensional sensing data is efficiently transferred by applying compressed sensing using dictionary learning.

A depth map is reconstructed highly accurately from a sensor terminal by feeding the depth map using minimal decimation, a specified vector to be used in restoration is extracted from the depth map restoration result by using a dictionary learning algorithm, and image data is reconstructed by using the extracted specified vector, and thus image data corresponding to a three-dimensional data depth map is efficiently transferred (in a state where the compression rate is high).

Because the data is decimated and transferred from the sensor terminal by using the compressed sensing method, the power is not concentrated on low-frequency components unlike discrete cosine-based filtering, and thus distance accuracy is maintained.

Furthermore, at the time of compression, the image data is transferred in a form in which the compression rate of the image data is higher than the compression rate of the depth map, and a dictionary for image data restoration is generated from the depth map. Therefore, a region having a high correlation with the depth map is preferentially reconstructed in the image data, thereby enabling efficient transfer of three-dimensional data.

In particular, whereas existing methods are suitable for efficiently compressing the three-dimensional data itself, this method is suitable for a system that directly compresses and expands sensing information serving as original data for constructing three-dimensional data.

According to a representative embodiment of the present invention, it is possible to reduce the data communication volume of sensing information of three-dimensional data to be transmitted from a sensor terminal, and thus realize an efficient sensing system. Problems, configurations, advantageous effects, and the like, other than those described above will be clarified by the following description of the embodiments.

DESCRIPTION OF THE PREFERRED EMBODIMENTS

Hereinafter, various embodiments of the present invention will be described with reference to the drawings. Note that each embodiment is an example to illustrate the present invention, and omission and simplification are made, as appropriate, for the sake of clarity of description. The present invention can also be carried out in various other forms.

In a case where there is a plurality of components having the same or similar functions, same may be described with different subscripts added to the same reference signs. In addition, in a case where it is not necessary to distinguish between the plurality of components, descriptions may sometimes be provided with the subscripts omitted.

First Embodiment

The present invention relates to a technology for performing three-dimensional recognition of a surrounding environment from a sensor signal and for supporting autonomous operation, remote work, and remote control, and can contribute to solving social problems such as maintenance and inspection of equipment by an autonomous mobile robot, for example. Further, according to the present invention, it is possible to realize an IoT system that efficiently compresses sensing data serving as a source for generating three-dimensional data and that transmits and utilizes the obtained three-dimensional data in real time.

Figure 1:
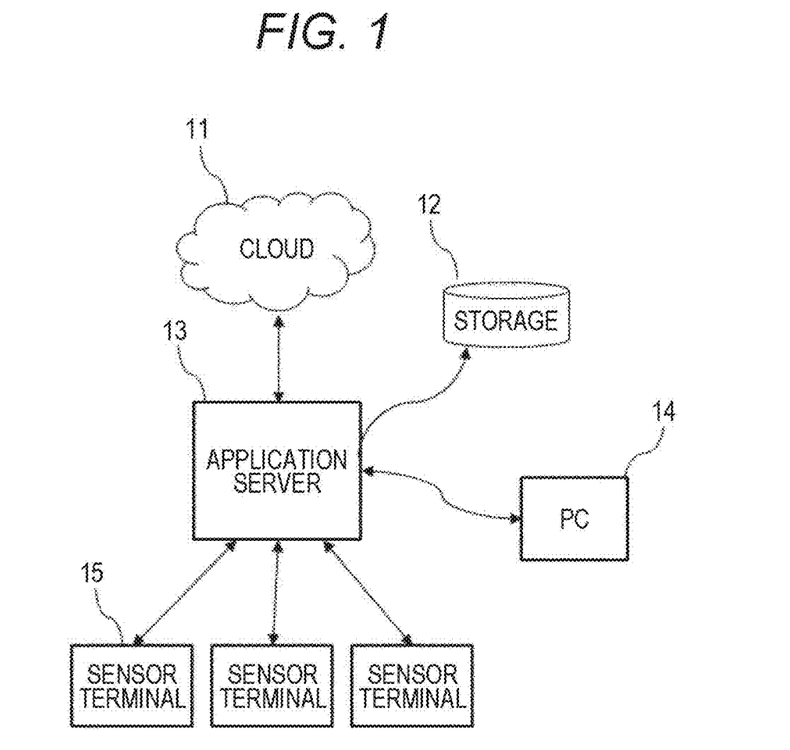
FIG. 1 is a diagram illustrating an example of a configuration of a first embodiment of a sensing system of the present invention.

FIG. 1 illustrates a configuration of a first embodiment of the present invention. The present embodiment is an embodiment of a compressed sensing system, and a method therefor, for transmitting three-dimensional data as at least depth information or parallax information and color information, the system transmitting partially reduced data on a transmission side and restoring the data on a reception side based on a basis matrix and sparsity, wherein, at the time of restoration, the reception side obtains an additional basis vector from restoration information of the depth information or the parallax information and a restoration result of the color information, and uses the basis vector in restoration of at least one of the depth information or the parallax information, and the color information.

A sensing system according to the first embodiment includes a cloud 11, an application server 13 connected to the cloud, local resources such as a PC 14 and a storage 12, and a sensor terminal 15. The sensor terminal 15 is connected to a network via an application server, and as the number of sensor terminals increases, the links between the sensor terminals and the application server may become bottlenecks in a communication band. In particular, three-dimensional data has a larger data size than image data, and an efficient compression/expansion system is not known versus those for two-dimensional images and moving images. It is therefore desirable to reduce the volume of communication data of each link.

The present embodiment was principally designed for the purpose of reducing data communication volume between a sensor terminal having a lower processing power than an application server or an edge node, and the edge node and the application server. However, a similar method can also be applied to a link between sensor terminals, a connection between an edge node and an application server, or a connection between an application server and the cloud, and the like.

Figure 9:
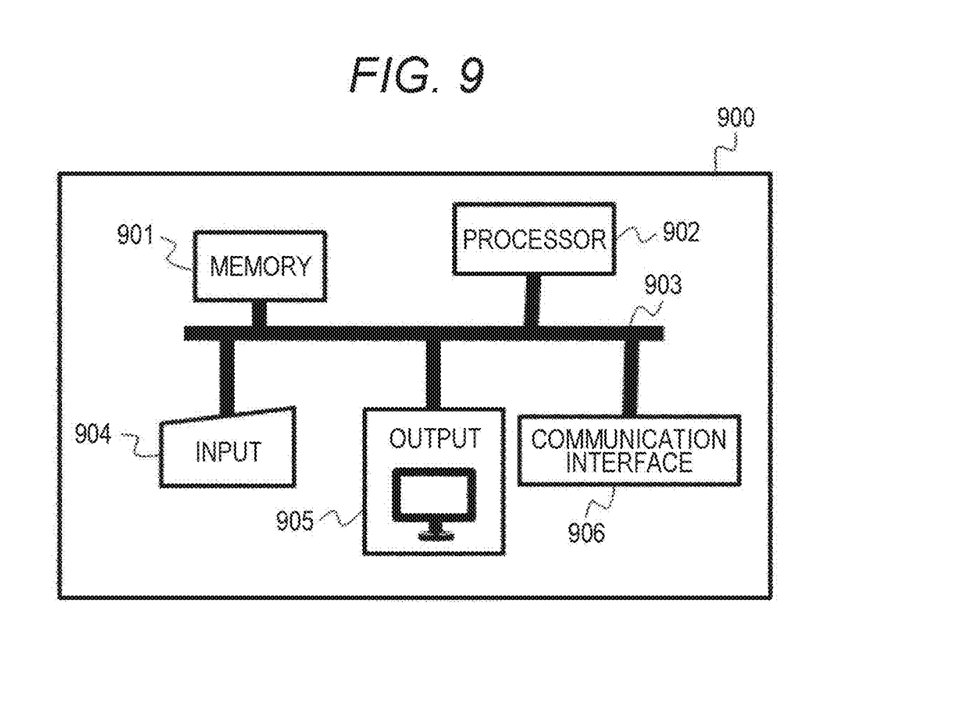
FIG. 9 is a diagram illustrating an example of a typical hardware configuration of a PC.

Note that FIG. 9 illustrates a typical hardware configuration 900 of the PC 14 in FIG. 1. That is, the PC 14 has a configuration in which a processor 902, which serves as a processing unit, a memory 901, an input unit 904, an output unit 905, and a communication interface 906 are connected to a bus 903. The application server has a similar configuration.

Figure 2:
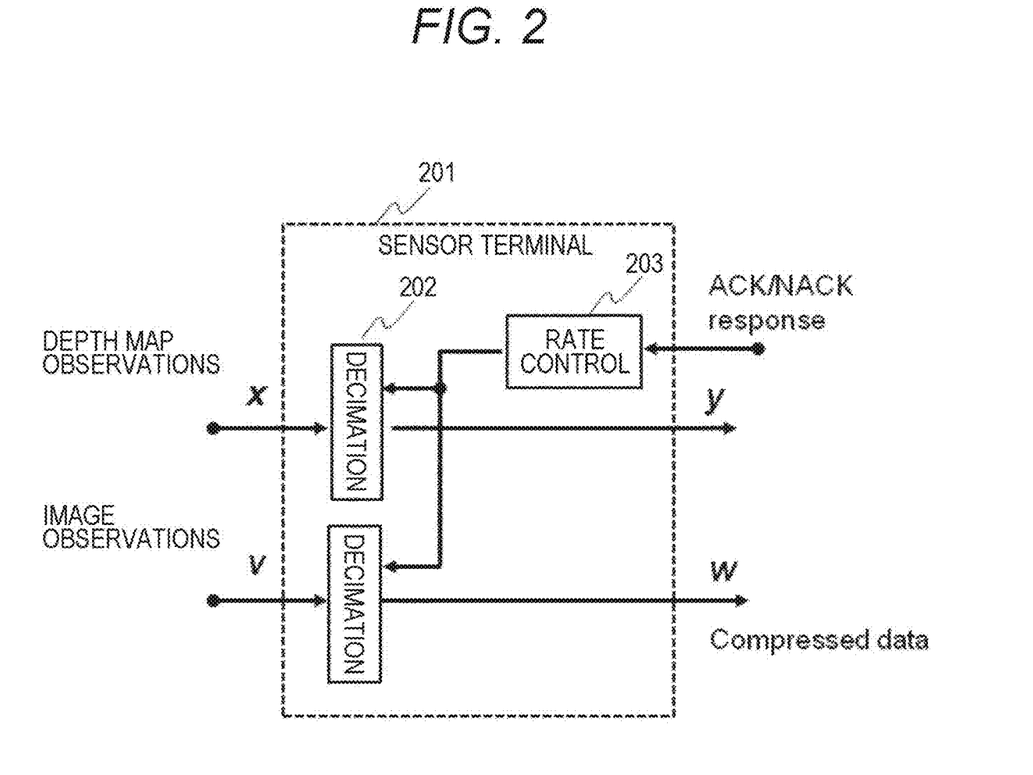
FIG. 2 is a diagram illustrating an example of a configuration of a sensing system of the present invention.

FIG. 2 is a diagram illustrating compressed processing using a sensor terminal having a configuration according to the first embodiment. In the present embodiment, the sensor terminal 201 randomly performs data decimation 202 on each of depth information x (corresponding to the distance from the sensor terminal to the target) and color information v (corresponding to two-dimensional image data) to reduce the data communication volume, and generate compressed data y of the depth information and compressed data w of the color information. The ratio between the respective decimation is controlled by a compression rate control unit 203. Here, the random data decimation is a pseudo random signal known by a reception terminal, and the system is designed to enable a decimation pattern to be detected by the reception terminal. The compression rate control unit determines the ratio of data that is decimated using random decimation. For example, in an application for which the positional accuracy of an object or the accuracy of the distance to a target object is important, the compression rate of the compressed data y of the depth information is set low, and the compression rate of the color information is set relatively high in comparison with the compression rate of the depth information, and thus the entire volume of data to be transferred can be reduced while maintaining the accuracy of the three-dimensional position information. The decimation rates of the respective information sources are determined by prior knowledge based on knowledge and statistical information for each application or by using state transitions based on responses such as ACK/NACK responses from the reception side (the application server, cloud, or the like). For example, in a case where the restoration accuracy on the reception side is insufficient and an ACK is not returned or a NACK is returned, the compression rate is reduced. Normally, in a case where the compression rate is dynamically changed based on the response of a receiver, a certain hysteresis is provided to stabilize the control. In a case where there is an emphasis on reducing the processing load of the sensor terminal, it is desirable to determine the compression rate control only using prior knowledge (design value) and not to perform adaptive control.

Figure 3:
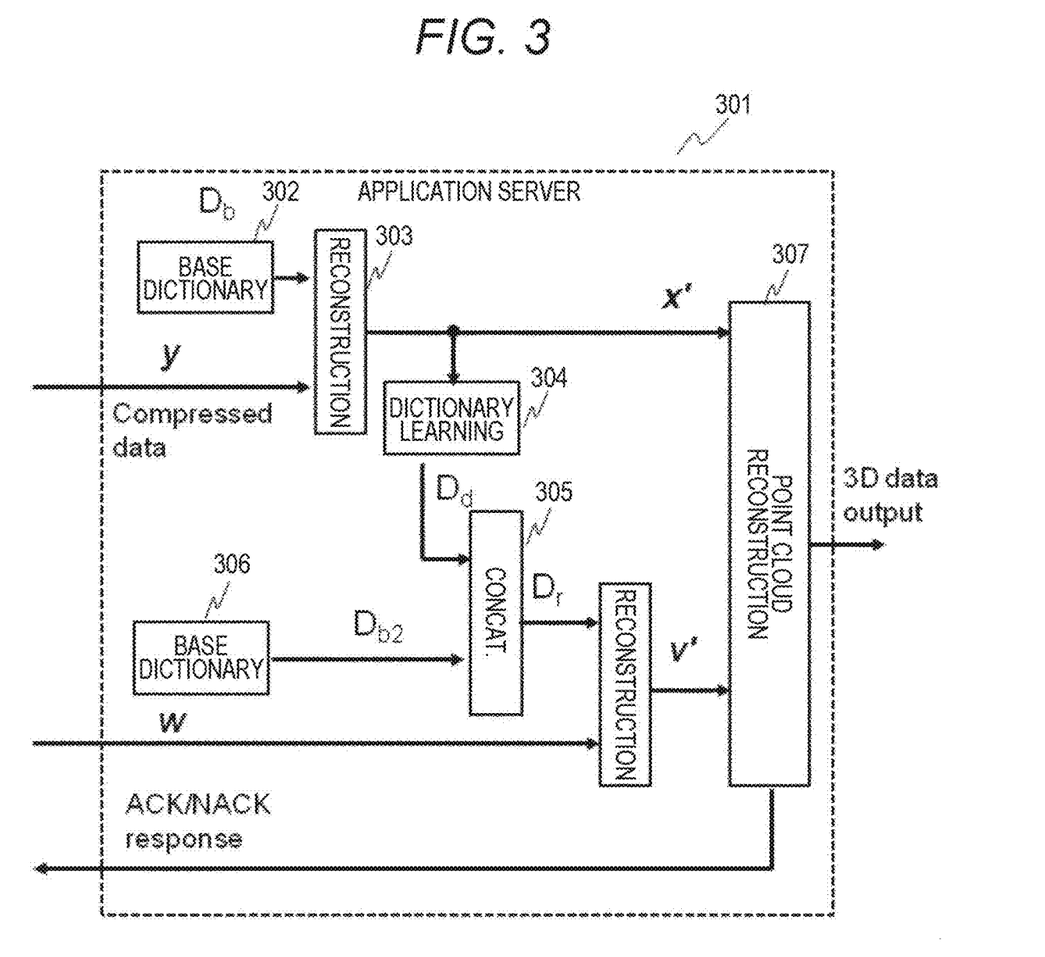
FIG. 3 is a diagram illustrating compressed processing using a sensor terminal of the present invention.

FIG. 3 is a diagram illustrating a configuration of a data restoration processing unit of the application server (reception side) according to the first embodiment. In the data restoration processing, restoration processing based on sparsity of decimated data is performed.

Assuming that a decimated observation value (compressed data) is y, a sparse representation of the original observation value is x, and a transformation matrix is A, and assuming that the data after restoration is x', the restoration processing becomes a search problem of Equation (1).

[Equation 1]

$$[x'] = \mathrm{argmin}|x|_0 \text{ subject to } y = Ax \qquad \text{Equation (1)}$$

For restoration based on sparsity, it is optimal to use the l0 norm, but because the amount of processing increases exponentially with an increase in the number of data, approximation processing using the l1 norm is normally used.

The restoration processing in this case is represented by Equation (2).

[Equation 2]
$$[x'] = \mathrm{argmin}|x|_1 \text{ subject to } y = Ax \quad \text{Equation (2)}$$

In a case where Lasso, which is obtained by adding L1 regularization to the least squares is used, Equation (3) is obtained.

[Equation 3]
$$[x'] = \mathrm{argmin}\|y - Ax\|^2 + \lambda|x| \quad \text{Equation (3)}$$

As a method for enhancing restoration accuracy, a method utilizing a dictionary matrix D by using transmitted data is known. When a matrix Y employing an observation data y vector for training which is used for learning=[y1, y2, y3, y4, . . . ] and a sparse representation matrix thereof is X, dictionary learning is obtained by repeating a step 1 of fixing the dictionary matrix D and searching for a sparse representation xi and a step 2 of fixing the sparse representation xi and updating the dictionary. Here, step 1 is represented by Equation (4).

[Equation 4]
$$\mathrm{argmin}\|y_j - Dx_j\| \text{ subject to } |x_j| \quad \text{Equation (4)}$$

In addition, step 2 is represented by Equation (5).

[Equation 5]
$$D_{k+1} = YX_k^T(X_k X_k^T)^{-1} \quad \text{Equation (5)}$$

Here, Dk+1 is an updated dictionary.

A restoration processing unit 301 of the application server performs restoration processing 303 on the received decimated depth information y by using a general-purpose dictionary 302. As a general-purpose dictionary, a matrix that includes a basis vector such as the Discrete Cosine Transform, the Walsh-Hadamard transform, or the Wavelet transform is used. The reconstructed depth information x' is used as a training matrix of a dictionary for restoring the color information w, and additional dictionary learning 304 is performed. The color information w is reconstructed using a general-purpose dictionary 306 and the additional dictionary 304. As a result, the feature having a high correlation between the depth information y and the color information w is used for restoration, the restoration accuracy becomes relatively high even in a case where the compression rate of the color information is high, and restoration processing 307 is performed as the final three-dimensional point group data. Accordingly, the three-dimensional information of y and w can be compressed and expanded highly efficiently.

Figure 4:
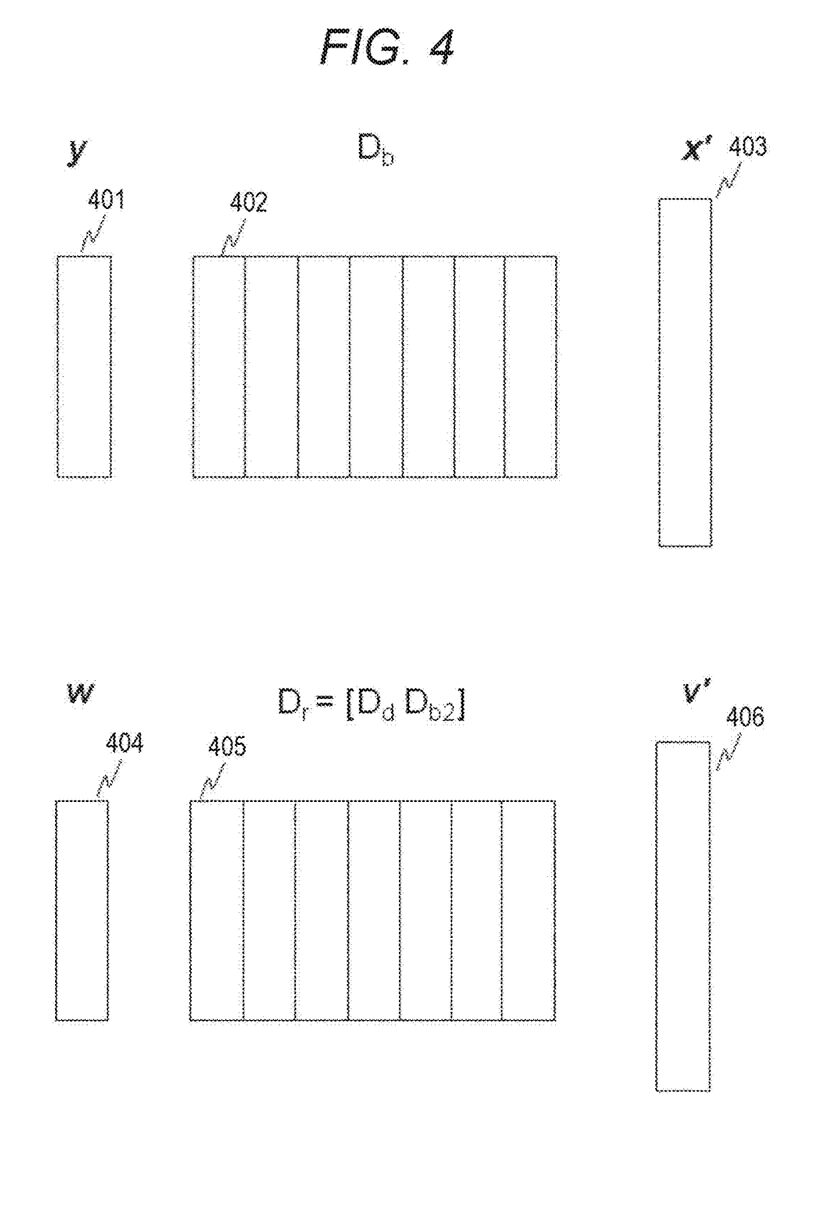
FIG. 4 is a diagram illustrating compressed processing using an edge node of the present invention.

FIG. 4 illustrates a configuration of a dictionary used for signal restoration according to the present embodiment. In the present embodiment, the dictionary used for restoring the depth information is only Db. A dictionary Dr used to reconstruct the color information uses a dictionary Dd obtained by learning based on the restoration result of the depth information such that Dr=[Dd Db2].

Figure 5:
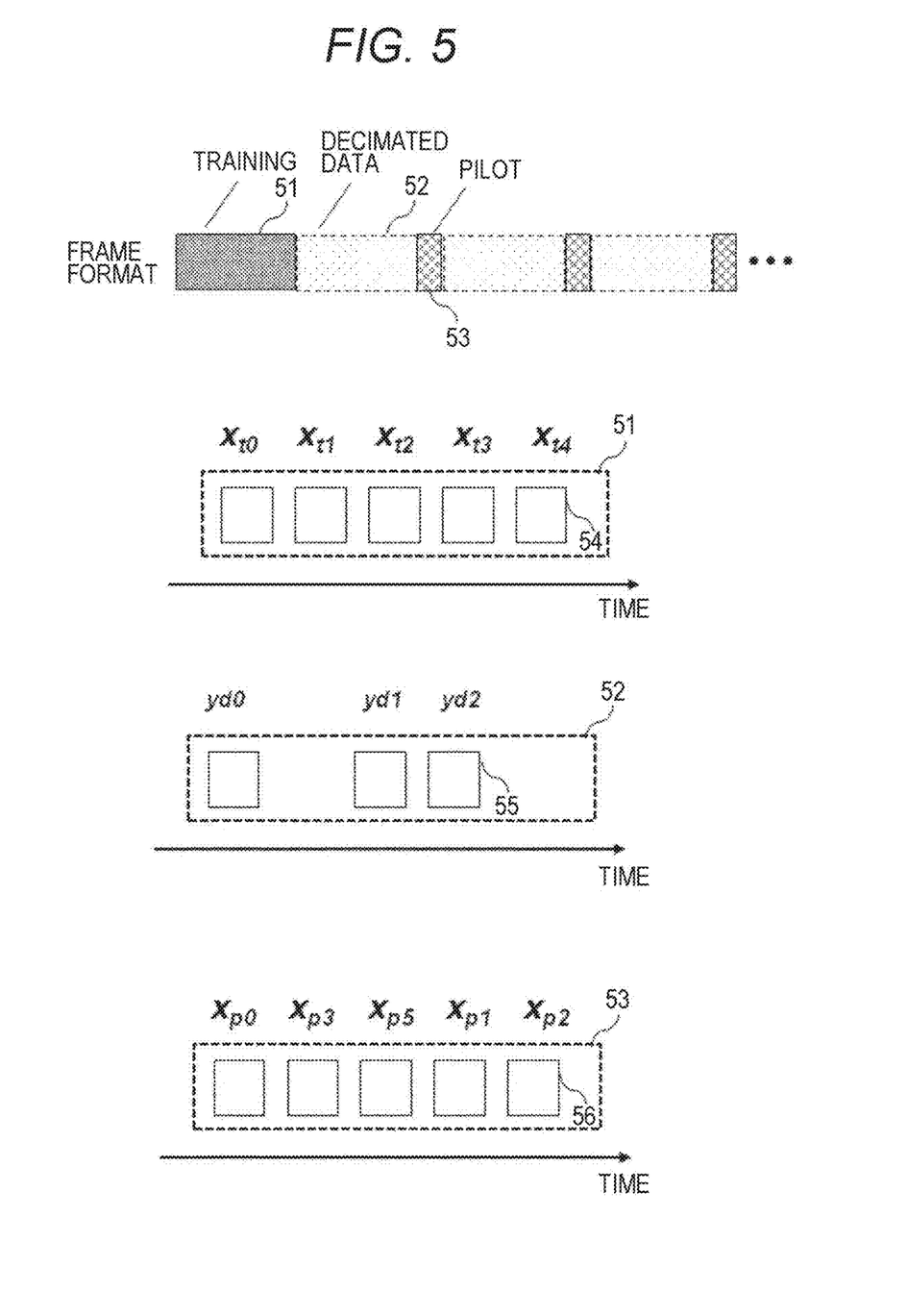
FIG. 5 is a diagram illustrating data restoration processing using an application server of the present invention.

FIG. 5 illustrates a configuration of training data used for dictionary learning according to the present embodiment. In a case where a dictionary is to undergo adaptive learning with respect to sensing data, a frame that includes a period for transmitting undecimated training data 51, a period for transmitting decimated data 52, and, if necessary, a transmission period of pilot data for correcting the dictionary learning by using a small amount of training data 53 is set. The training data 51 is a signal including an undecimated observation value xt which is used for dictionary learning. Decimated data yd is normal transmission data, and a high compression rate can be realized by setting a sufficiently longer period than for the training data and the pilot data. Pilot data xp is training data for correction in which a non-decimated training signal is transmitted at the same data rate as the decimated data a plurality of times.

Second Embodiment

Figure 6:
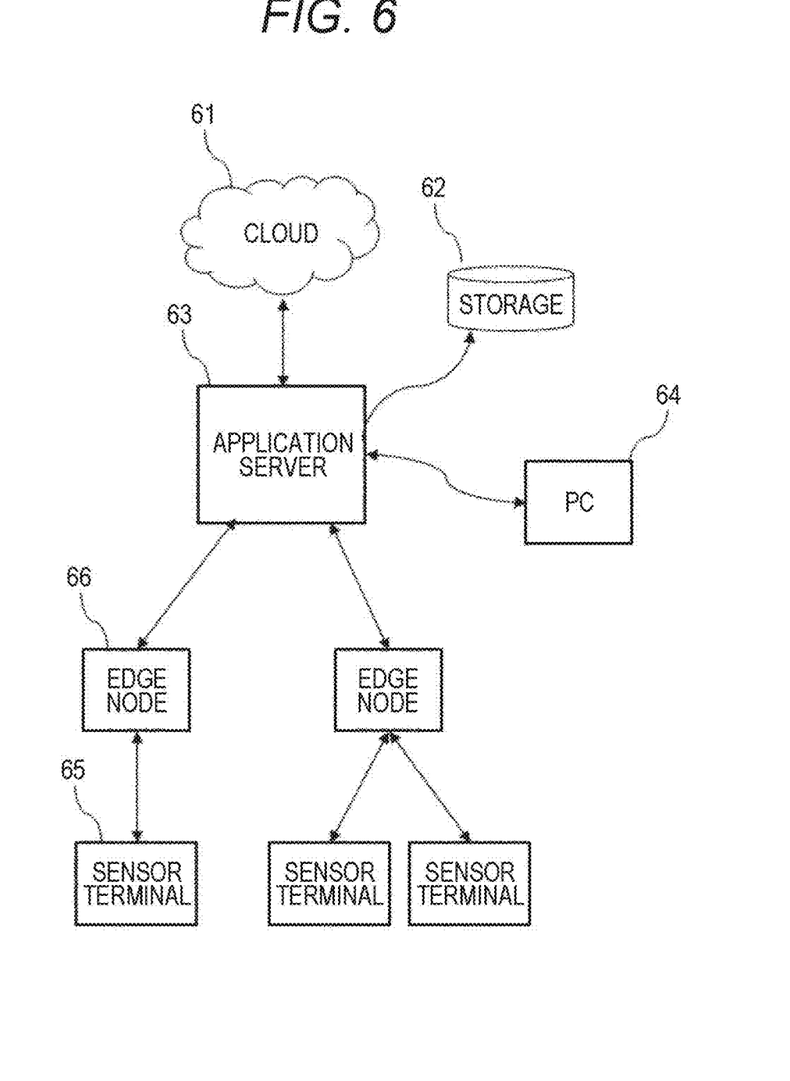
FIG. 6 is a diagram illustrating dictionary learning processing of the present invention.

FIG. 6 illustrates a configuration according to a second embodiment of the present invention. FIG. 6 is a diagram illustrating a configuration of the sensing system of the present invention in a case where an edge node 66 exists between an application server 63 and a sensor terminal 65. For three-dimensional data, there are cases where a target object is sensed from a plurality of angles and the angles are used to generate the final three dimensions. In a case where a plurality of sensor terminals are installed locally, the processing load is distributed by using a configuration in which an edge node is placed upstream of an application server to offload the processing of the application server.

Figure 7:
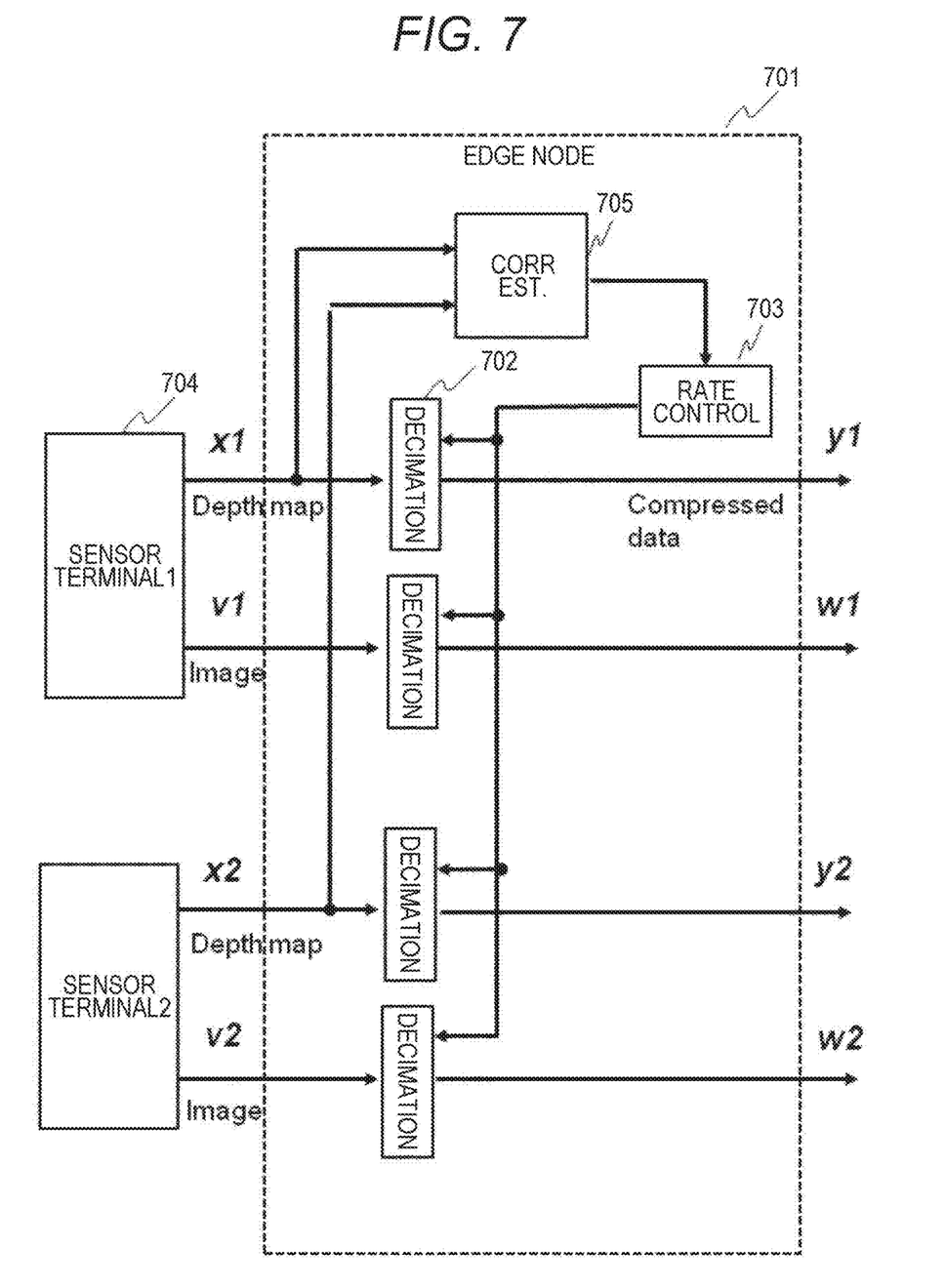
FIG. 7 is a diagram illustrating a configuration of training data used for dictionary learning of the present invention.

FIG. 7 is a diagram illustrating compressed processing by an edge node in a case where data from a plurality of sensor terminals is collectively compressed by the edge node. Because the edge node has information of a plurality of sensor terminals, data redundancy can be estimated from a correlation between sensing data across the plurality of sensor terminals, and hence the compression rate can be more optimally controlled. For example, in a case where the data correlation is high, the overall data volume is reduced by increasing the decimation ratio of data on one side.

Figure 8:
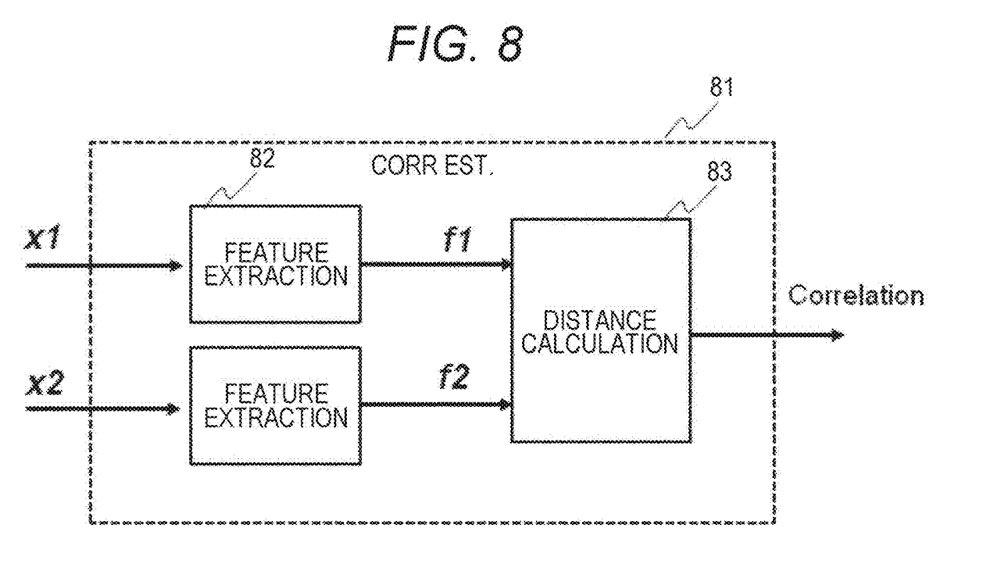
FIG. 8 is a diagram illustrating a configuration of a processing unit that estimates a correlation between sensing data of sensor terminals according to a second embodiment of the present invention.

FIG. 8 is a diagram illustrating a configuration of a processing unit that estimates a correlation between sensing data of sensor terminals according to the second embodiment. In FIG. 8, image feature vectors f1 and f2 are extracted by feature extractors with respect to depth maps x1 and x2 of two sensors, respectively. The similarity between the extracted feature vectors is calculated from the distance between the feature vectors, and the magnitude of the correlation is estimated. As the feature extractors, a method for vectorizing feature maps of arbitrary layers of a neural network, image line segment detection, a method for performing polar coordinate transformation on a contour image, or a method using a rotational scale-invariant feature is used. The Euclidean distance, Mahalanobis distance, cosine similarity, or the like is used for the vector similarity calculation.

The present invention is not limited to or by the embodiments described above, and further includes various modifications. For example, the above-described embodiments have been described in detail to facilitate understanding of the present invention, and are not necessarily limited to or by embodiments having all the configurations described. In addition, part of the configuration of one embodiment can be replaced with the configuration of another embodiment, and the configuration of the other embodiment can also be added to the configuration of the one embodiment. Moreover, it is also possible to add, delete, or replace a configuration included in another embodiment with respect to part of the configuration of each embodiment.

What is claimed is:

1. A compressed sensing system for transmitting three-dimensional data as at least depth information or parallax information and color information, the system transmitting partially reduced data on a transmission side and restoring the data on a reception side based on a basis matrix and sparsity,
   wherein, at the time of restoration, the reception side obtains an additional basis vector from restoration information of the depth information or the parallax information and a restoration result of the color information, and uses the basis vector in restoration of at least one of the depth information or the parallax information, and the color information, and
   wherein the transmission side uses data decimation to perform data compression and controls a first decimation rate of the depth information or the parallax information and a second decimation rate of the color information based on prior knowledge of an application of the compressed sensing system received from the reception side, to cause a first compression rate of the depth information or parallax information transmitted by the transmission side and a second compression rate of the color information transmitted by the transmission side to be different from each other.

2. The compressed sensing system according to claim 1, wherein the first and second decimation rates on the transmission side are changed according to an ACK response output from the reception side and received by the transmission side.

3. The compressed sensing system according to claim 1, wherein the basis matrix used in data restoration on the reception side is a basis vector of the Discrete Cosine Transform, the Discrete Fourier transform, the Walsh-Hadamard transform, or the Wavelet transform.

4. The compressed sensing system according to claim 1, wherein the basis matrix used in data restoration on the reception side includes a specified vector obtained through dictionary learning by using a training signal from the transmission side.

5. The compressed sensing system according to claim 4, wherein the sensor terminal uses a predetermined constant cycle to transmit a training signal and decimated data or a pilot signal.

6. A compressed sensing system for transmitting three-dimensional data as at least depth information or parallax information and color information, the system transmitting partially reduced data on a transmission side and restoring the data on a reception side based on a basis matrix and sparsity,
   wherein, at the time of restoration, the reception side obtains an additional basis vector from restoration information of the depth information or the parallax information and a restoration result of the color information, and uses the basis vector in restoration of at least one of the depth information or the parallax information, and the color information, and
   wherein the transmission side includes an edge node that mediates three-dimensional data from at least two different sensor terminals, and the edge node changes a compression rate based on a correlation between the three-dimensional data from the two different sensor terminals.

7. The compressed sensing system according to claim 6, wherein correlation estimation is performed by using a feature extractor to calculate feature vectors of respective data of different sensor terminals and calculating the distance between the feature vectors.

8. The compressed sensing system according to claim 7, wherein feature extraction is calculated by combining feature maps of arbitrary layers of a neural network.

9. The compressed sensing system according to claim 7, wherein the feature extraction is calculated using image line segment detection, a method for performing polar coordinate transformation on a contour image, and a method using a rotational scale-invariant feature.

10. The compressed sensing system according to claim 7, wherein the Euclidean distance, the Mahalanobis distance, or the cosine similarity is used as the distance between the feature vectors.

11. A compressed sensing method comprising:
   transmitting three-dimensional data as at least depth information or parallax information and color information by transmitting partially reduced data on a transmission side; and
   reconstructing the three-dimensional data on a reception side based on a basis matrix and sparsity,
   wherein, at the time of restoration, the reception side obtains an additional basis vector from restoration information of the depth information or the parallax information and a restoration result of the color information, and uses the basis vector in restoration of at least one of the depth information or the parallax information, and the color information, and
   wherein the transmitting the three-dimensional data further comprises using decimation to perform data compression and controlling a first decimation rate of the depth information or the parallax information and a second decimation rate of the color information based on prior knowledge of an application of the compressed sensing system received from the reception side, to cause a first compression rate of the depth information or parallax information transmitted by the transmission side and a second compression rate of the color information transmitted by the transmission side to be different from each other.

* * * * *